United States Patent [19]

Johnson

[11] Patent Number: 4,467,460

[45] Date of Patent: Aug. 21, 1984

[54] SEISMIC DATA ACQUISITION METHOD

[75] Inventor: Philip W. Johnson, Tulsa, Okla.

[73] Assignee: The Standard Oil Company, Chicago, Ill.

[21] Appl. No.: 238,316

[22] Filed: Feb. 26, 1981

Related U.S. Application Data

[63] Continuation-in-part of Ser. No. 61,713, Jul. 30, 1979, abandoned.

[51] Int. Cl.$^3$ .............................................. G01V 1/36
[52] U.S. Cl. ........................................ 367/56; 367/50; 364/421
[58] Field of Search ................... 367/50, 56, 58, 63; 364/421, 422

[56] References Cited

U.S. PATENT DOCUMENTS

| | | | |
|---|---|---|---|
| 3,352,377 | 11/1967 | Citrone et al. | 367/56 |
| 3,539,982 | 11/1970 | Hileman et al. | 367/50 |
| 3,597,727 | 8/1971 | Judson et al. | 367/50 |
| 3,697,939 | 10/1972 | Musgrove | 367/54 |
| 3,731,269 | 5/1973 | Judson et al. | 367/54 |
| 3,775,738 | 11/1973 | Quay et al. | 367/56 |
| 3,790,929 | 2/1974 | Mayne et al. | 367/56 |
| 3,794,827 | 2/1974 | Widess | 367/56 |
| 3,867,713 | 2/1975 | Tegland et al. | 367/56 |
| 3,940,734 | 2/1974 | Blum | 367/50 |
| 4,048,612 | 9/1977 | Lawyer | 367/61 |
| 4,316,268 | 2/1982 | Ostrander | 367/50 |

OTHER PUBLICATIONS

Larner et al., "Simultaneous Estimation . . . Profiles", 9/22/77, p. 1518, 47th SEG Mtg. Canada.
Toner et al., "Estimation and Correction . . . Anomolies", 4/2/71, pp. 441-463, Geophysics, SEG Mtg. 24.

*Primary Examiner*—Nelson Moskowitz
*Attorney, Agent, or Firm*—Timothy D. Stanley

[57] ABSTRACT

The field locations of seismic shot points are chosen to produce partial multifold data, the static correction equations of which are at least partially coupled. The seismic cross sections resulting therefrom are substantially improved.

10 Claims, 7 Drawing Figures

|  | SOURCE INDEX | RECEIVER INDEX | SURFACE LOCATION INDEX | DEPTH INDEX |
|---|---|---|---|---|
| ① | 1 | 1 | 1 |
| | | 2 | 2 |
| ② | 3 | 3 |
| | 4 | 4 |
| ③ | 5 | 5 |
| | 6 | 6 |
| ④ | 7 | 7 |
| | 8 | 8 |
| ⑤ | 9 | 9 |
| | 10 | 10 |
| ⑥ | 11 | 11 |
| | 12 | 12 |
| ⑦ | 13 | 13 |
| | 14 | 14 |

Depth index 1 through 14 corresponding to surface positions 28 27 26 25 24 23 22 21 20 19 18 17 16 15 14 13 12 11 10 9 8 7 6 5 4 3 2.

FIG. 4

GROUP INDEX LAYOUT

| DEPTH INDEX | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | SOURCE INDEX | SOURCE LOCATION INDEX |
|---|---|---|---|---|---|---|---|---|---|---|---|---|---|---|---|---|---|---|---|---|---|---|---|---|---|---|---|---|---|---|
| 1 | | | | | | | | | | | | | | | | | | | | | | | | | 4 | 3 | 2 | 1 | 1 | (1) |
| 2 | | | | | | | | | | | | | | | | | | | | | | 6 | 5 | 4 | 3 | 2 | 1 | | 2 | (2) |
| 3 | | | | | | | | | | | | | | | | | | | 9 | 8 | 7 | 6 | 5 | 4 | 3 | 2 | 1 | | 3 | (5) |
| 4 | | | | | | | | | | | | | | 14 | 13 | 12 | 11 | 10 | 9 | 8 | 7 | 6 | 5 | 4 | 3 | 2 | 1 | | 4 | (6) |
| 5 | | | | | | | | | | | | 14 | 13 | 12 | 11 | 10 | 9 | 8 | 7 | 6 | 5 | 4 | 3 | 2 | 1 | | | | 5 | (9) |
| 6 | | | | | | | | 14 | 13 | 12 | 11 | 10 | 9 | 8 | 7 | 6 | 5 | 4 | 3 | 2 | 1 | | | | | | | | 6 | (10) |
| 7 | 14 | 13 | 12 | 11 | 10 | 9 | 8 | 7 | 6 | 5 | 4 | 3 | 2 | 1 | | | | | | | | | | | | | | | 7 | (13) |

FIG. 5

| SOURCE INDEX | RECEIVER INDEX | SURFACE LOCATION INDEX | DEPTH INDEX |
|---|---|---|---|
| ① | 1 | 1 | 2 |
| ② | 2 | 2 | 4 3 |
| | 3 | 3 | 6 5 |
| | 4 | 4 | 8 7 |
| ③ | 5 | 5 | 10 9 |
| | 6 | 6 | 12 11 |
| | 7 | 7 | 14 13 |
| | 8 | 8 | 16 15 |
| ⑤ | 9 | 9 | 18 17 |
| ⑥ | 10 | 10 | 20 19 |
| | 11 | 11 | 22 21 |
| | 12 | 12 | 24 23 |
| ⑦ | 13 | 13 | 26 25 |
| | 14 | 14 | 28 27 |

FIG. 6

| DEPTH INDEX | SOURCE LOCATION INDEX |
|---|---|
| 1 | (1) |
| 2 | (2) |
| 3 | (5) |
| 4 | (6) |
| 5 | (9) |
| 6 | (10) |
| 7 | (13) |

GROUP INDEX LAYOUT (source index rows 1–7, group indices 28 27 26 25 ... 3 2 1):

Row 1: 2 1
Row 2: 4 3 2 1
Row 3: 5 4 3 2 1
Row 4: 6 5 4 3 2 1
Row 5: 7 6 5 4 3 2 1
Row 6: 8 7 6 5 4 3 2 1
Row 7: 9 8 7 6 5 4 3
(continued pattern through group indices 28 27 26 25 24 23 22 21 20 19 18 17 16 15 14 13 12 11 10 9 8 7 6 5 4 3 2 1)

SEISMIC DATA ACQUISITION METHOD

This application is a continuation-in-part of application Ser. No. 061,713, filed July 30, 1979, now abandoned.

FIELD OF THE INVENTION

This invention relates to seismic exploration and more particularly to a method for the acquisition of multifold seismic data.

BACKGROUND OF THE INVENTION

A well-known seismic data collection technique is the taking of "multifold" data on a seismic line. Data taken by such a technique can be used to produce a two-dimensional representation of subsurface structure; i.e., a seismic section. A common implementation of this two-dimensional technique is the popular "roll-along" method in which a plurality of separate seismic shots are initiated at regular intervals on a seismic line; for each separate initiation the set of seismic receivers is effectively moved in corresponding intervals along the seismic line. By using this technique, redundant common depth point data are obtained which are used to improve the signal-to-noise ratio and to increase the accuracy of the structural mapping of the resulting seismic section. This technique is shown schematically in FIG. 1, in which the layout of the seismic line is shown for a series of roll-along shots. The recording geometry shown in FIG. 1 produces a maximum of 14-fold data by the use of 14-channel recording and one group interval between each source point.

In order to systematize the collection of multifold data, it is desirable to lay out a set of grid points as shown by the indexing scheme in FIG. 1. With this well-known arrangement, a system of standard static correction equations can be conveniently characterized as follows:

$$T_{i,r} = I_i + R_r + C_d + (X_{i,r}^2 M_d)$$

$$d = i + r$$

wherein i is the source location index, r is the group index, d is the depth index, $T_{i,r}$ is the observed two-way time for the seismic energy to travel the particular ray path from source point, i, to group, r, $I_i$ is the initiation static-error term, $R_r$ is the receiver static error term, $C_d$ is the true two-way time which is desired for mapping, and the product $X_{i,r}^2 M_d$ is the normal moveout correction term.

For the data acquisition arrangement shown, there would be 196 such equations (i.e., 14 shot points × 14 receiver locations). With this arrangement, separate shots are initiated at each of grid locations 1 through 14 while seismic recordings are being made at receiver locations 1 through 14. Fourteen-fold data is thus produced for depth index 15, with the fold (multiplicity) tapering to a value 1 at each end of the seismic line as shown in FIG. 2.

In certain seismic exploration areas where the static correction problem is not especially difficult, it is a common practice for seismic crews to attempt to increase their efficiency by regularly skipping index locations. This practice, as depicted schematically in FIG. 3, results in the production of "partial" multifold seismic data. In this Figure, fully one-half of the possible source locations have been skipped in a regular alternating manner, thus reducing the fold from 14 to seven, as depicted in FIG. 4. This approach commonly results in significant savings of time and money without seriously adversely affecting the signal-to-noise ratio and the quality of static correction of the recorded data. There often is, however, an undesirable "zig-zag" pattern which appears in the resulting seismic section when the prior art "partial" multifold approach such as depicted in FIG. 3 is used. FIG. 7 shows a seismic section having the above-mentioned zig-zag pattern superimposed thereon, as indicated by the triangles and circles. It will be appreciated by the reader that the typical zig-zag patterns shown in FIG. 7 clearly detract from the interpretability and accuracy of the displayed seismic section. This problem has long plagued practicing geophysicists.

It is therefore an object of the instant invention to provide a method for seismic exploration using a new "partial" multifold data collection technique which substantially eliminates the production of zig-zag patterns on the corresponding seismic section displays. The method of the instant invention results from the discovery by the Applicant of the reason for the zig-zag patterns of the prior art, as well as a practical field technique for eliminating the same.

SUMMARY OF THE INVENTION

During his studies and investigations concerning the processing and interpretation of "partial" multifold seismic data, the Applicant has determined the cause of the problem with the prior art technique as is discussed above and depicted in FIG. 7. The problem, in brief, involves the "coupling" of different elements of the solutions to the above described system of standard static correction equations. In particular, the subsets of these equations according to common depth point resulting from each seismic initiation using the prior art technique, as depicted in FIGS. 3 and 4, are mathematically "decoupled" into two sets of equations which are independent of each other. The solutions thereof may not match properly— resulting in the zig-zag patterns observed in the prior art seismic sections as shown in FIG. 7. The decoupling may be seen in FIG. 4 in that only even numbered receiver indices are members of odd numbered CDP's and vice versa. Thus there is no mathematical coupling of odd and even receiver indices. A crucial aspect of the method of the instant invention thus comprises a field technique for assuring the proper "coupling" of the produced adjacent subsets of standard static correction equations according to common depth point. This is accomplished by avoiding the symmetry to the prior art technique for "partial" multifold data collection such as, for example, depicted in FIG. 3 so that the resulting subsets of equations according to common depth point are at least minimally partially coupled, preferably continuously and at least minimially partially coupled and most preferably, continuously, directly, and at least minimally partially coupled.

As used herein, at least minimally partially coupled means that at least two adjacent subsets of equations according to common depth point share at least one common receiver index. At least minimal partial coupling can be accomplished, for example, by assuring that there is at least one adjacent source pair in at least one spread of detectors in each areal configuration for seismic exploration. An adjacent source pair is a pair of source points located adjacent one another; i.e., one receiver interval apart in a spread of detectors.

Continuous and at least minimal partial coupling means that no subset of equations according to common depth point exists which is mathematically independent from the remaining set of equations. This can be accomplished by assuring that each subset of equations according to common depth point has, either directly or indirectly, at least one receiver index in common with each adjacent subset of equations according to common depth point. The subsets are directly continuously coupled when each subset of equations according to common depth point shares at least one receiver index with each adjacent subset of equations according to common depth point. The subsets are indirectly coupled when each subset of equations according to common depth point shares at least one receiver index with one or more nonadjacent subsets of equations according to common depth point and the nonadjacent subset(s) in turn shares, directly or indirectly, a receiver index with the adjacent subsets of equations. One readily implementable method for assuring continuous, direct, and at least minimal coupling is to require that there be at least one adjacent source pair per spread of detectors in an areal configuration for seismic exploration.

Plenary partial coupling is a form of continuous, direct, and at least minimal partial coupling wherein each subset of standard static correction equations according to common depth point directly shares at least two receiver indices with each adjacent subset of standard static correction equations according to common depth point. The method of the instant invention for plenary coupling thus requires that source points be spaced adjacent one another, for example, one receiver interval apart at least as frequently as twice per spread length (two adjacent source pairs per spread), while maintaining an average spacing which will produce the desired fold. This is illustrated in FIG. 5. The average spacing therein between source points is two, which is the same as the average spacing of the conventional technique of FIG. 3, and thus produces the same average fold. This new approach allows the sets of standard static correction equations to be directly coupled betwen odd and even receivers as shown in FIG. 6.

As indicated, a variety of source patterns can be used in order to implement the method of this invention. The crucial factor is that the standard set of equations must not be subdivided into independent sets of equations. The operation coupling produced by the method of this invention makes it possible to accomplish substantial elimination of the zig-zag patterns observed in the prior art seismic sections. If the source patterns are designed to have adjacent source points as often as is possible while still producing the desired fold, the degree of the coupling and the resuling seismic sections will be improved to an even larger extent.

BRIEF DESCRIPTION OF THE DRAWING

For a more complete understanding of the instant invention, and for depicting further objects and advantages thereof, reference is now made to the following detailed description of the preferred embodiment taken in conjunction with the accompanying drawings, in which:

FIG. 1 depicts the typical arrangement of sources and receivers for the prior art technique for obtaining complete multifold data.

FIG. 2 shows the resultant array of receiver indices as a function of source points and depth indices corresponding to FIG. 1.

FIG. 3 depicts the technique of FIG. 1 modified to produce partial fold coverage.

FIG. 4 shows the resultant array of receiver indices as a function of source points and depth indices corresponding to FIG. 3.

FIG. 5 shows a preferred embodiment of an arrangement of sources and receivers for the method of the instant invention.

FIG. 6 shows the resultant array of receiver indices as a function of source points and depth indices corresponding to FIG. 5.

DETAILED DESCRIPTION OF THE PREFERRED EMBODIMENT

Figures 1, 2:
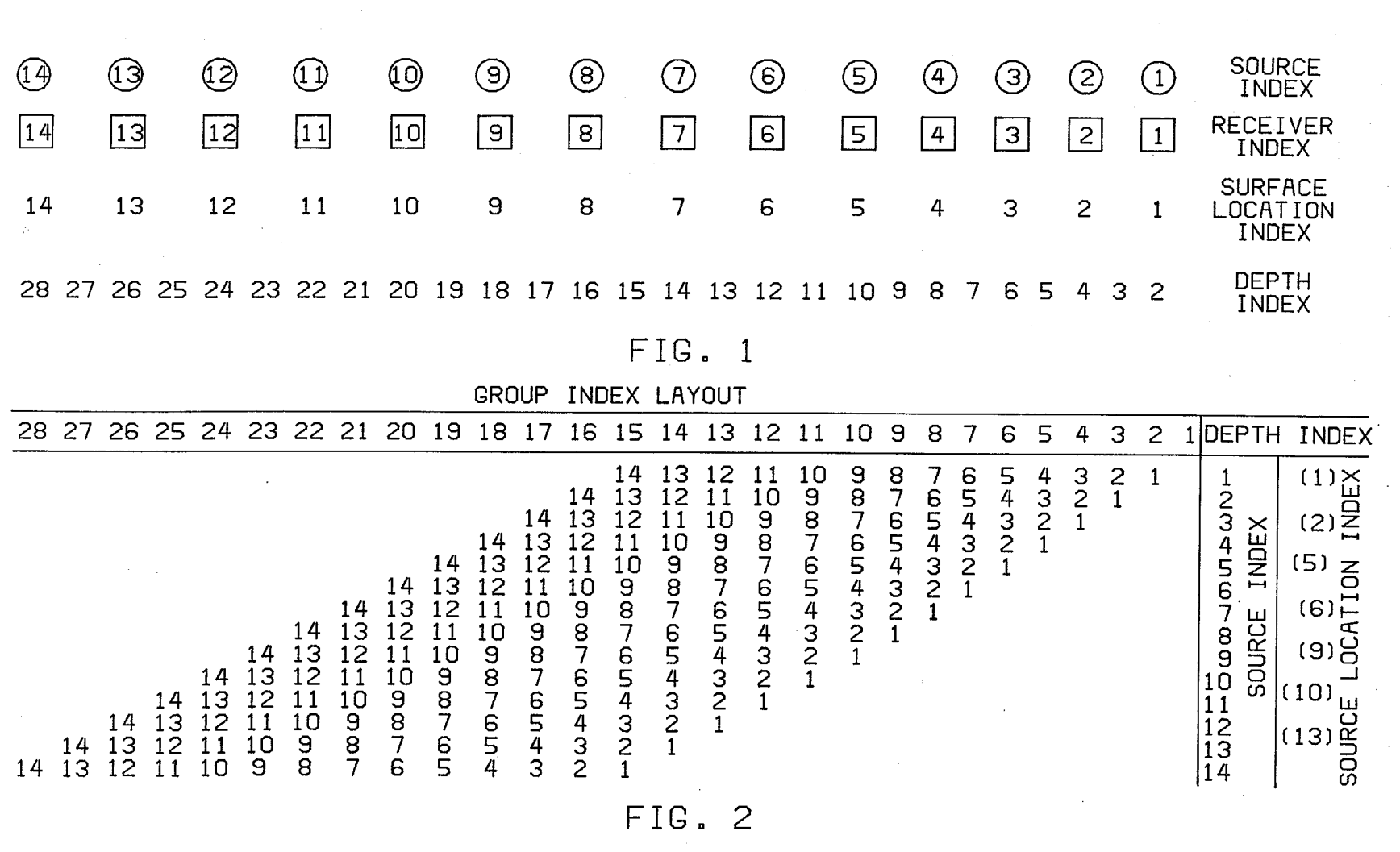
Figure 7:
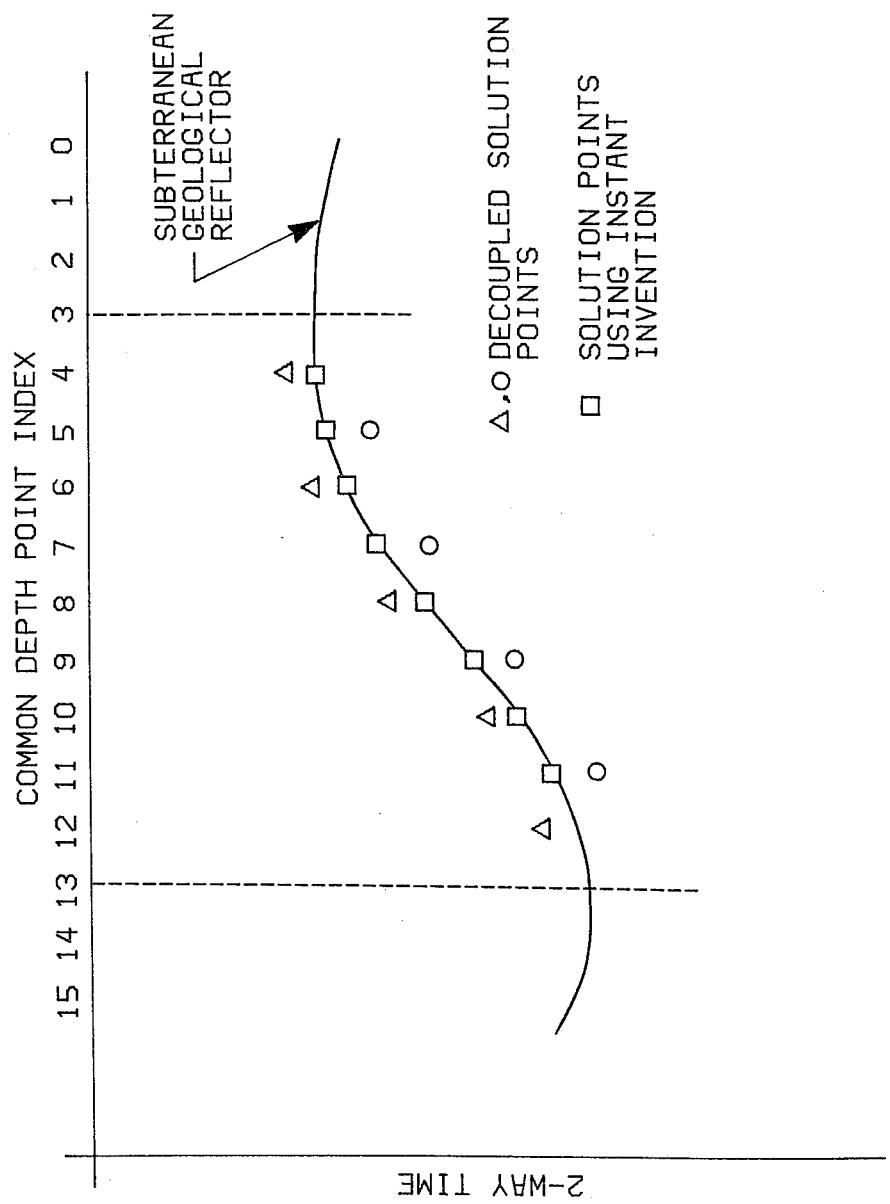
FIG. 7 shows typical seismic cross sections resulting from prior art partial multifold coverage superimposed on the preferable display produced by the method of the instant invention.

The two-dimensional seismic data acquisition technique depicted in FIG. 1 is a well-known method for obtaining repetitive or redundant seismic data. With this approach, the receiver patterns (i.e., the string of numbered receiver locations shown in FIG. 1) correspond directly to the source locations and every surface location index. This technique results in full-fold data. Except for a transition zone on each end of the coverage, complete 14-fold redundant data is produced. This multiple-fold data can be used with well-known seismic data processing techniques to produce seismic sections which have increased quality with respect to both signal-to-noise ratio and static correction accuracy. For these reasons, this technique is widely used by geophysical explorationists. It will be quickly recognized by the reader that a serious drawback of this approach is the requirement of a large number of source and receiver locations needed to implement the method. Thus, with a long line of sources and receivers, the production of multifold data using a complete full-fold technique, such as depicted in FIG. 1, will be quite expensive in terms of seismic crew utilization.

As discussed above in the Background of the Invention, a common technique for reducing expenses while still retaining an adequate degree of fold along the seismic line is accomplished by skipping N source locations of the normal complete multifold pattern between every souce actually used. FIGS. 3 and 4 show, respectively, the layout of this "partial" multifold technique along with the resulting array of receiver indices as a function of source points and depth indices.

The preferred embodiment of the instant invention comprises the seismic data collection technique as depicted in FIG. 5, wherein the shot points are spaced in a manner similar to that of the prior art (as depicted in FIG. 3), but the source locations are specially situated so that there is continuous, direct, at least minimal partial coupling of the receiver indices throughout the standard system of statics equations. This approach will guarantee the proper "coupling" of the resulting sets of standard static correction equations. In other words, no subset of static correction equations exists which is mathematically independent from the remaining set. The solutions of these sets of equations (typically found by use of the standard "Gauss-Seidell" method) are thus continuously coordinated or "coupled" so that the discontinuities apparent in the prior art seismic cross sections are substantially eliminated. It is to be understood that the application of this method to only a part of the seismic line would nevertheless have substantial beneficial effect on the resulting seismic cross section.

It should be noted that the preferred, "partial" multifold data collection technique of the instant invention employs the same number of source points as used with the prior art approach. Hence, little or no additional expense will be incurred by employing the technique of the instant invention, even though a very significant improvement in the resulting seismic sections is realized, as depicted in FIG. 7.

Other patterns which implement the method of the instant invention are also possible, as long as the requirement of continuous and at least minimal partial coupling of the equation solutions is met. The instant invention is therefore not limited to the particular pattern depicted in FIG. 5, but rather is to be restricted only within the scope of the appended claims.

What is claimed is:

1. A method for the taking of seismic data, wherein the full-fold common depth point technique is altered to reduce the required number of records without substantial detrimental effects to the interpretability of the resulting seismic sections, comprising:

omitting the use of one or more of the normal full-fold seismic source points; and arranging the remaining source points with respect to the detectors so that the resulting system of linear static correction equations remains continuously and at least minimally partially coupled according to common depth point, each seismic source and detector being at preselected locations during the time of source initiation and the taking of seismic data, thereby assuring seismic data with respect to common depth points;

whereby no subset of equations according to common depth point exists which is mathematically independent from the remaining set of equations.

2. A method according to claim 1 wherein the remaining source points are arranged so that the resulting system of linear static correction equations remains continuously, directly, and at least minimally partially coupled.

3. A method according to claim 1 wherein the remaining source points are arranged so that sequentially alternating adjacent pairs of source locations are used and omitted.

4. A method according to claim 1 wherein the remaining source points are arranged so that the resulting system of linear static correction equations remains continuously, indirectly, and at least minimally partially coupled.

5. A method according to claim 1 wherein the remaining source points are arranged so that at least one adjacent source pair occurs in at least one spread of an areal configuration for seismic exploration.

6. A method according to claim 1 wherein the remaining source points are arranged so that at least one adjacent source pair occurs in each spread of an areal configuration for seismic exploration.

7. A method according to claim 1 wherein the remaining source points are arranged so that at least two adjacent source pairs occur in each spread of an areal configuration for seismic exploration.

8. A method according to claim 5 wherein approximately one-half of the full-fold seismic source points are omitted.

9. A method according to claim 6 wherein approximately one-half of the full-fold seismic source points are omitted.

10. A method according to claim 7 wherein approximately one-half of the full-fold seismic source points are omitted.

* * * * *